United States Patent [19]
Feigler et al.

[11] Patent Number: 5,788,043
[45] Date of Patent: Aug. 4, 1998

[54] REACTION PLATE FOR FRICTION CLUTCH, IN PARTICULAR FOR MOTOR VEHICLES

[75] Inventors: Jacques Feigler, St. Brice S/Foret; Ayman Mokdad, Saint-Ouen; Patrice Bertin, Mery/Oise, all of France

[73] Assignee: Valeo, Paris, France

[21] Appl. No.: 564,070

[22] PCT Filed: Apr. 13, 1995

[86] PCT No.: PCT/FR95/00483

§ 371 Date: Feb. 9, 1996

§ 102(e) Date: Feb. 9, 1996

[87] PCT Pub. No.: WO95/28576

PCT Pub. Date: Oct. 26, 1995

[30] Foreign Application Priority Data

Apr. 14, 1994 [FR] France ................................ 94 04438

[51] Int. Cl.⁶ ........................... F16D 13/58; F16D 1/00
[52] U.S. Cl. ........................... 192/214; 74/574; 403/269; 403/406.1; 464/62
[58] Field of Search ........................ 192/214, 212, 192/89.23, 89.24, 70.17, 70.27; 74/574; 403/406.1, 266, 269; 464/62, 66

[56] References Cited

U.S. PATENT DOCUMENTS

| | | | |
|---|---|---|---|
| 1,728,619 | 9/1929 | Lambert | 403/269 X |
| 3,499,512 | 3/1970 | Maurice | |
| 4,069,905 | 1/1978 | De Gennes | 192/89.23 X |
| 4,362,230 | 12/1982 | Corral | |
| 4,600,092 | 7/1986 | Billet | |
| 5,160,007 | 11/1992 | Reik et al. | 192/70.17 |
| 5,368,327 | 11/1994 | Shiraki et al. | 403/406.1 X |

FOREIGN PATENT DOCUMENTS

| | | | |
|---|---|---|---|
| 4118686 | 12/1992 | Germany. | |
| 4309570 | 9/1993 | Germany | 192/89.23 |
| 2243884 | 11/1991 | United Kingdom. | |

*Primary Examiner*—Rodney H. Bonck
*Attorney, Agent, or Firm*—Longacre & White

[57] ABSTRACT

A reaction plate for a friction clutch comprising a cover which includes a mounting insert fixed in the body of the reaction plate. The insert includes, on the outer periphery of the reaction plate, a projecting area for mounting the friction clutch cover.

15 Claims, 5 Drawing Sheets

REACTION PLATE FOR FRICTION CLUTCH, IN PARTICULAR FOR MOTOR VEHICLES

BACKGROUND OF THE INVENTION

1. Field of the Invention

The present invention relates to reaction plates of mouldable material for a friction clutch, especially for motor vehicles.

2. Description of the Prior Art

As is known, such a reaction plate, also known as an engine flywheel, affords a friction surface for engagement with a friction disc furnished with friction liners, which may optionally be of divided form, and which are arranged to be gripped between the said reaction plate and the pressure plate of the clutch.

The pressure plate is subject to the action of axially acting resilient means such as a diaphragm or coil springs, which bear on a cover plate adapted to be fixed on the reaction plate, the latter being optionally of two-part form.

Such a reaction plate, which is typically in the form of a casting, can be seen for example in the document FR-A-2 463 874 (U.S. Pat. No. 4,362,230).

In that document, the cover plate has at its outer periphery a radial flange which is provided with fastening surface portions whereby it is secured to the reaction plate.

This fastening is obtained by means of screws, so that it is necessary to machine the surface of the reaction plate that faces towards the fastening surface portions of the cover plate, and to form threads in the latter for the fastening screws.

In a modified version, the cover plate can be secured on the reaction plate by seaming, as is described in the document FR-A-2 526 105 (U.S. Pat. No. 4,600,092).

In that case, it is again necessary to machine the reaction plate in order that the cover plate can be secured.

In addition, these reaction plates are specific to the cover plate with which they are associated.

An object of the present invention is to mitigate these drawbacks in a simple and inexpensive way, and accordingly to reduce the machining operations on the reaction plate, while having the option of fastening the cover plate in various different ways.

SUMMARY OF THE INVENTION

According to the invention, a reaction plate of the type described above is characterised in that it includes a fastening insert anchored in the mass of the said reaction plate, being buried within the latter, and in that the said insert has, projecting in the vicinity of the outer periphery of the reaction plate, a fastening zone for the fastening of the cover plate of the friction clutch.

Thanks to the invention, machining operations on the reaction plate are considerably reduced, with the friction surface offered by the reaction plate to the friction disc being machined as in the prior art.

By contrast, the machining operations for fastening of the cover plate are eliminated, due to the presence of the fastening insert. No relative movement is able to occur between the insert and the reaction plate, due to the fact that the insert is buried in the reaction plate.

The said insert preferably stiffens the reaction plate because it is embedded in the latter.

Thus the material of the reaction plate can be a less sophisticated metal, leading to a reduction in cost.

Because of the insert, it is possible to reduce the thickness of the reaction plate, so giving a reduction in the overall axial size of the clutch, with the insert preferably then extending transversely in the reaction plate.

Where the reaction plate has an axially oriented skirt at its outer periphery, it is possible to reduce the height of this skirt, and therefore to obtain the advantage of an increase in the diameter of the friction surface of the friction disc.

In general terms, because of the inserts, the reaction plate is able to rotate at increased rotational velocities, and/or to transmit greater torques, this plate having enhanced resistance to the effects of centrifugal force.

This plate also has enhanced resistance to thermal effects, since its tendency to assume a conical form is reduced due to the presence of the insert embedded within the reaction plate.

This leads to a reduction in wear of the liners of the friction disc, and possibly to a simplification of the latter.

The reaction plate has no threaded holes for the fastening screws, so that stress raisers are reduced. The reaction plate is thus of more sound construction.

In addition, excellent fastening of the fastening insert is obtained.

In this connection, the latter is placed in the mould in which the reaction plate is formed, and during the moulding operation, in which, for example, liquid casting metal is poured into the mould, migration of carbon atoms takes place so that the fastening insert, which is preferably of metal, becomes heated.

The fastening insert, embedded in the mass of the reaction plate, is thus in effect welded to the latter. As a result, it is firmly secured.

It will be appreciated that the fastening insert enables the reaction plate to be standardised to an increased extent.

In this connection the insert constitutes an adaptor member.

It is therefore possible to fix the cover plate on the insert, by riveting, screw fastening, welding, adhesive bonding, seaming, clipping, or otherwise.

For example, by giving the fastening member a transverse flange which is directed radially towards the axis of the assembly, or, in a modified version, away from the axis of the assembly, it is possible to fix the cover plate on the fastening insert by means of screws or rivets, or by welding or otherwise.

In one embodiment, the fastening zone of the insert extends axially away from the reaction plate.

In this way it is possible to reduce the size of the clutch, within the region which is typically bounded by a clutch casing, by welding, seaming or clipping the cover plate on the fastening zone of the insert.

Fastening is preferably carried out by welding or alternatively by adhesive bonding in the case where the cover plate is of fibre reinforced plastics material, the cover plate having at its outer periphery an axially oriented flange which is adapted to cooperate with the inner periphery (or alternatively with the outer periphery) of the fastening zone of the insert, so that it has a centring function.

It is thus possible to insert the cover plate telescopically into the insert to a variable extent, so that the inclination and/or the load of the diaphragm, which is commonly part of a friction clutch, can thereby be precisely adjusted.

Once the correct inclination or load has been reached, the cover plate is welded or adhesively bonded on the fastening zone of the insert. It is equally possible to adjust the distance between the diaphragm and the free end of the engine crankshaft.

Thus, the course of travel of the clutch release bearing, which is adapted in the usual way to work in a traction or thrust mode on the ends of the fingers of the diaphragm, as the case may be, can be shortened.

In general terms, manufacturing tolerances can be made less precise, due to the fact that the cover plate is fitted telescopically on the insert, with intimate contact between these two components.

It is accordingly possible to come very close to the theoretical characteristic curve of the diaphragm.

It will be appreciated that the fastening insert enables the cover plate to be simplified.

In this connection, the cover plate can be flatter than in the prior art, since the fastening insert is an adaptor member which is of benefit to the standardisation of the cover plate.

Thus, the cover plate may have a flat profile at its outer periphery, and be provided with assembly means at its inner periphery for the pivotal mounting of the diaphragm on the cover plate. The machining of the cover plate is thereby simplified.

The fastening insert may have holes in its projecting portion, for ventilating the clutch. The said insert may also have apertures for mounting the pressure plate of the clutch, which is accordingly then provided with lugs arranged to cooperate in a complementary manner with the said apertures.

The pressure plate is thus coupled in rotation to the insert, while being mounted for axial movement with respect to the latter.

The insert facilitates the fitting of a clutch of the twin disc type.

Where the reaction plate has a skirt at its outer periphery, the said insert lies inside the said skirt.

The said insert may equally, of course, lie in the transverse portion of the reaction plate. All combinations are possible.

The insert is preferably formed with holes, which may be circular, oblong or ovoid, for anchoring it within the reaction plate. The shape of the holes depends on the application, and in particular on the stresses involved.

In this way the insert is fastened and anchored even more firmly, and increased torques can be transmitted, since the material of the reaction plate fills the holes. The stiffening of the reaction plate is thus increased even more, with improved welding of the insert without any increase in the thickness of the reaction plate.

It is of course possible to replace the holes with notches formed in the edges of the insert.

In a modified version, the insert may be provided with press formed portions, with the material of the reaction plate penetrating into the hollows of the press formed portions.

The press formed portions are preferably arranged in two groups, with one of the groups being directed in one direction and the other group in the other direction.

In a modification, the above mentioned alternate press formed portions may be replaced by alternate slits.

All combinations are of course possible, the insert having, for example, holes as well as press formed portions.

In all cases, the insert has deformations, formed through it or otherwise, for improving its anchorage in the reaction plate. These deformations thus constitute hooking means.

Because of the insert, it is possible to locate a friction device at the outer periphery of the reaction plate.

In a modified version, the starter crown can be fixed on the insert.

The following description illustrates the invention with reference to the attached drawings, in which:

DETAILED DESCRIPTION OF THE PREFERRED EMBODIMENT

Figure 1:
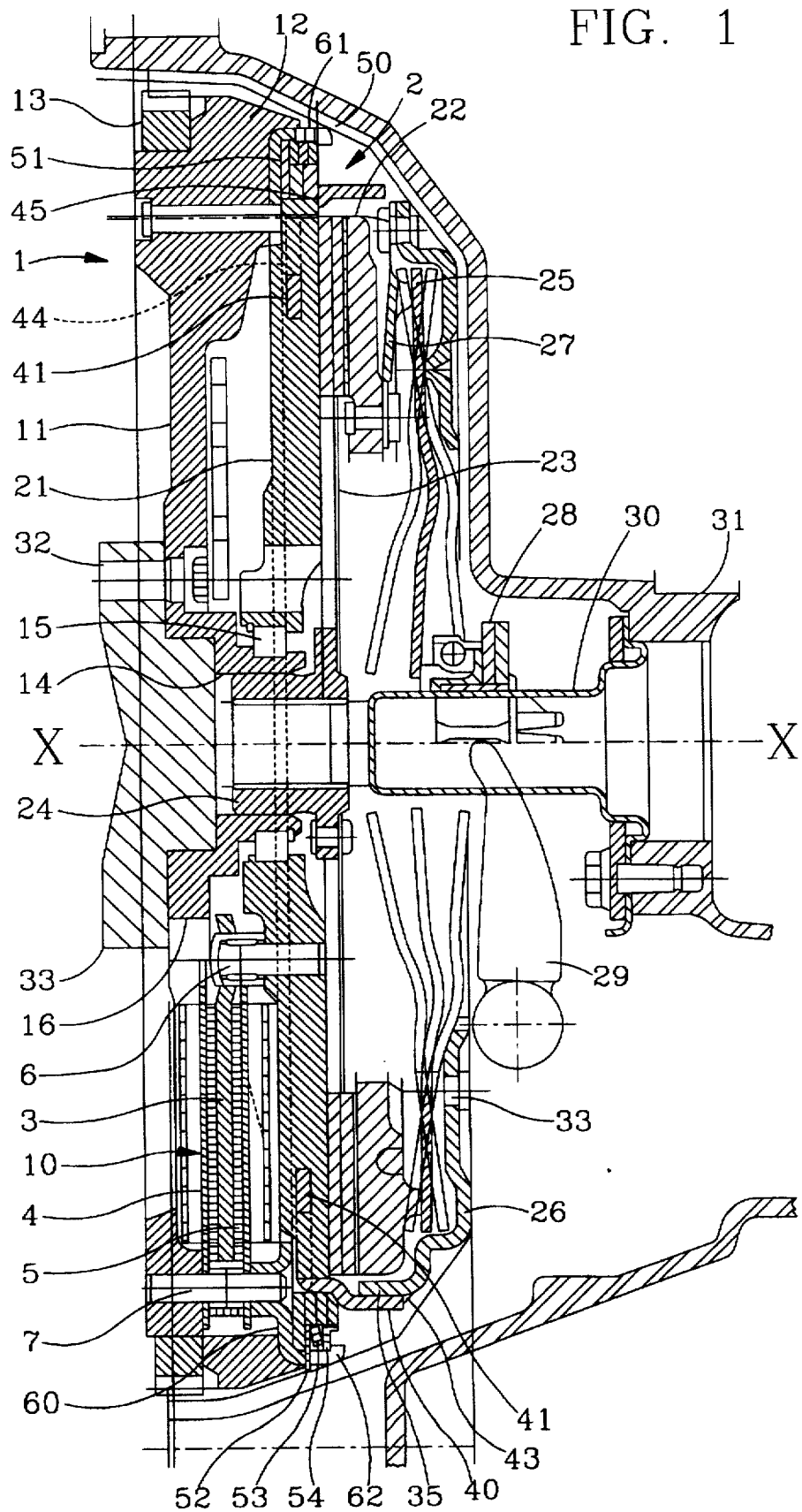
FIG. 1 is a view of a friction clutch equipped with a damped flywheel in accordance with the invention, shown in axial cross section taken on the line 1—1 in FIG. 2.
Figure 2:
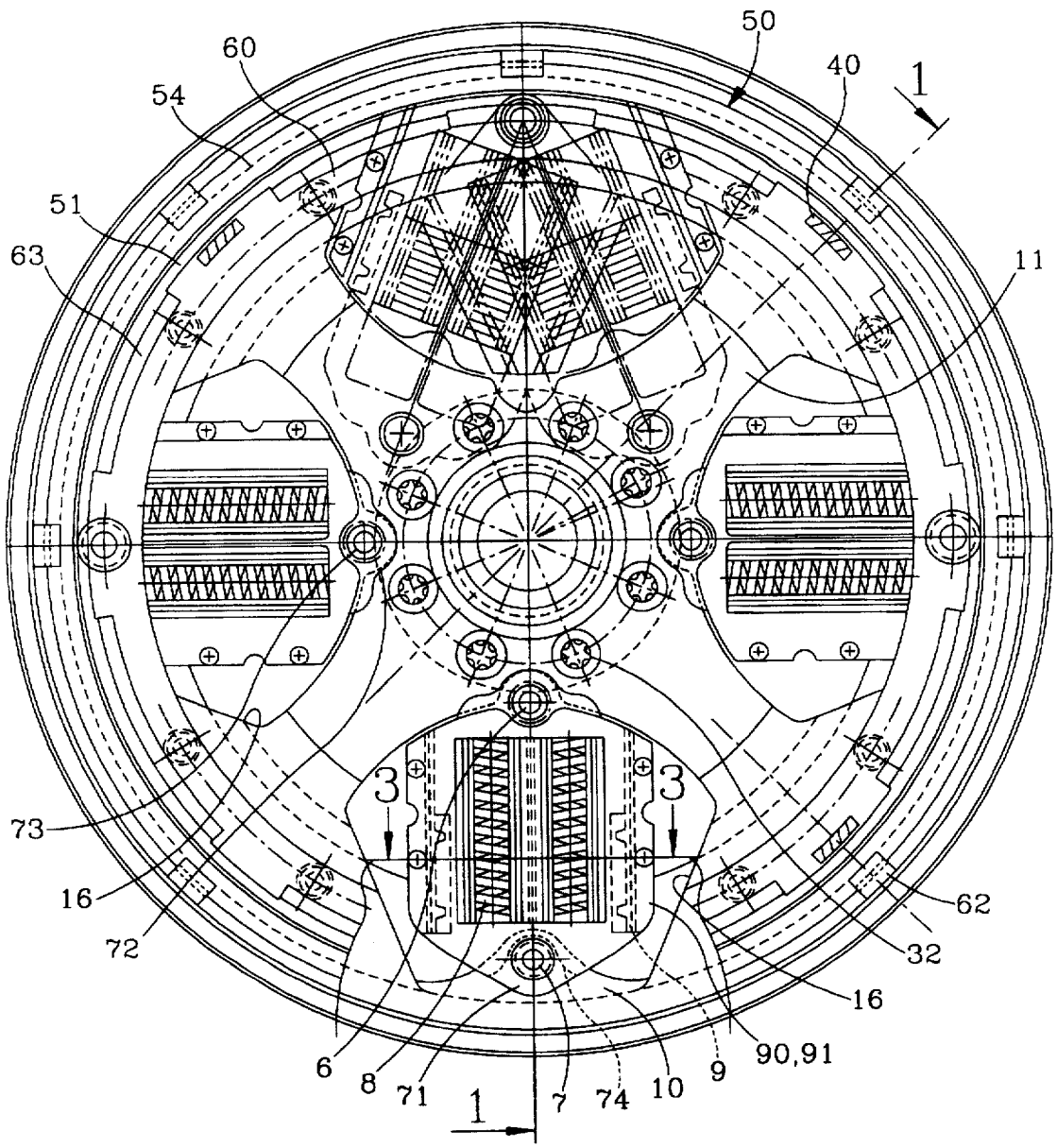
FIG. 2 is a front view, shown partly cut away, of a friction clutch without its reaction and pressure plates, and without its friction disc.
Figure 3:
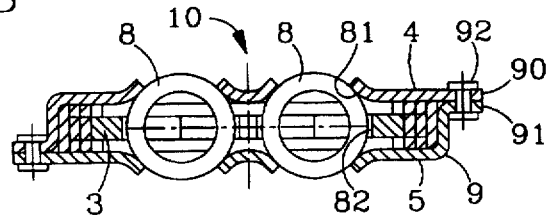
FIG. 3 is a view in cross section taken on the line 3—3 in FIG. 2.

FIGS. 1 to 3 show a torsion damping device comprising two coaxial parts 1, 2 which are mounted for movement of one with respect to the other against the action of resilient means 8 which are part of a resilient damping device.

This device is part of a damped flywheel for a motor vehicle.

The first part 1 consists of a plate 11, while the second part 2 again consists of a plate, 21, which extends parallel to the plate 11. The plates 11 and 21 are made of a mouldable material, typically in the form of a casting, in order to increase their inertia. In a modification, they may be aluminium based, the choice of material being dependent on the application.

As a general rule, and in a manner known per se, the molten metal is poured into a mould.

The two parts 1, 2 thus consist of coaxial masses, one of which rotates with respect to the other about the axial axis of symmetry X—X of the clutch.

The second mass 2 is mounted for rotation on a tubular hub 14 carried by the first mass 11. In this example, the hub 14 is integral with the plate 11, though in a modification it may be carried on the latter, while a bearing 15, which is a ball bearing in this example but which may, in a variant, be a plain bearing, is interposed between the outer periphery of the hub 14 and the inner periphery of the plate 21. The second mass 2, which is mounted for rotation on the mass 1 through the interposed bearing 15, constitutes the reaction plate of a friction clutch which includes, in the manner known per se, a pressure plate 22, a diaphragm 25 and a cover plate 26.

By contrast with a conventional arrangement (see FIGS. 4, 5 and 9), in which an engine flywheel constitutes the reaction plate of the clutch, the flywheel is here divided into two parts in a manner to be explained below.

In accordance with the invention, a reaction plate 21 of mouldable material, of the type described above, is characterised in that it includes a fastening insert 40, 41 which is anchored in the mass of the said plate 21, being buried into the latter, and in that the said insert 40, 41 has a projecting fastening zone 40 in the vicinity of the outer periphery of the reaction plate 21, for fastening the cover plate 26 of the friction clutch.

In this example the pressure plate 22, typically in the form of a casting, is coupled to the cover plate 26 with axial mobility, in the manner known per se, by means of inclined resilient tongues 27, each of which is fastened at one of its ends to the cover plate, and at its other end to a lug of the pressure plate 22.

This fastening is obtained by riveting in this example.

The diaphragm 25 is mounted on the cover plate 26 for tilting deflection, in this example by virtue of stub pieces 33, one of which can be seen in the lower part of FIG. 1. This stub piece has a head with which the diaphragm is arranged to engage, and which is aligned with a press formed depression formed in the base of the cover plate.

For more detail, reference should be made to the document FR-A-1 524 350 (U.S. Pat. No. 3,499,512).

Figure 4:
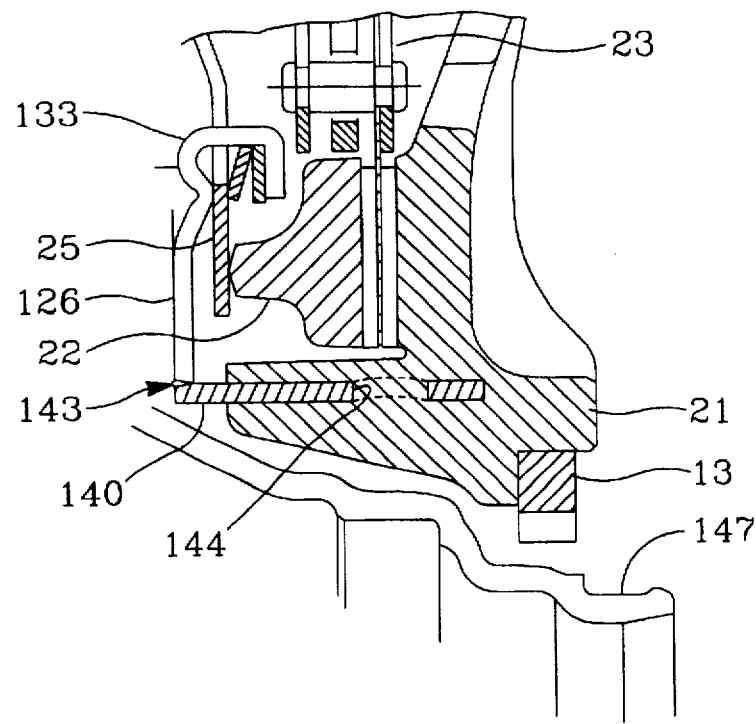
FIG. 4 is a view in cross section of part of a friction clutch in a second embodiment by way of example.
Figure 5:
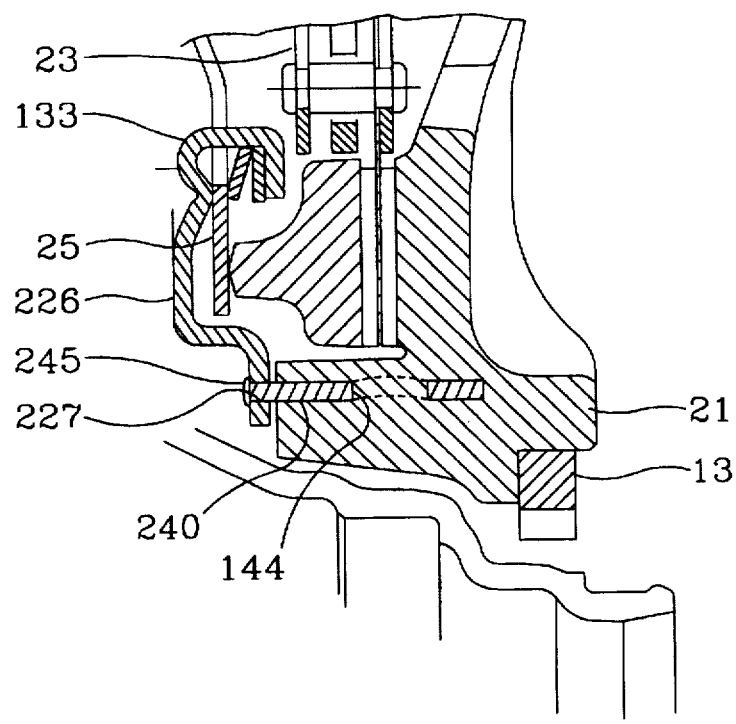
FIG. 5 is a view similar to FIG. 4, but shows a third embodiment by way of example.
Figure 9:
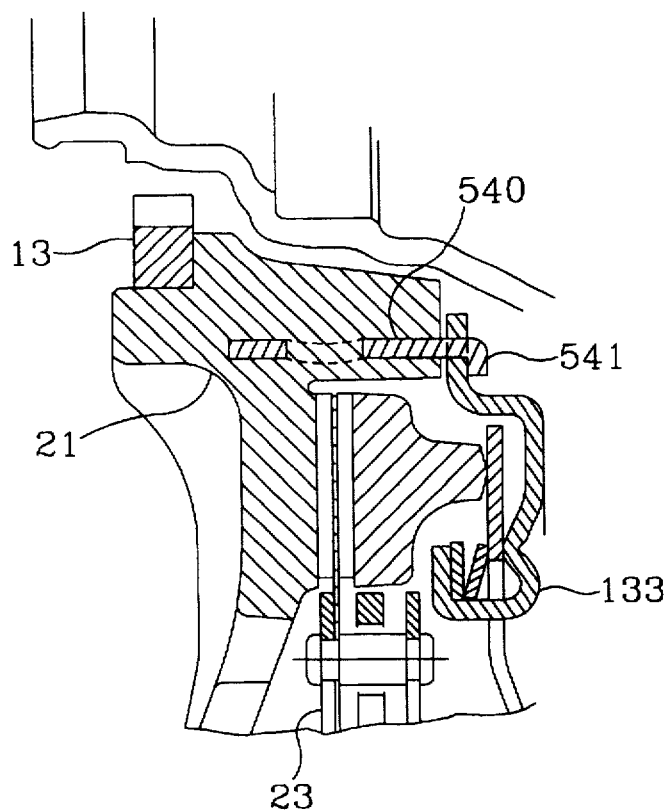
FIG. 9 is a view similar to FIG. 4, but shows a sixth embodiment by way of example.
Figure 10:
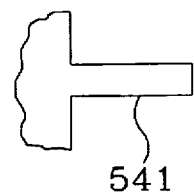
FIG. 10 is a partial view showing a clipping lug.

In a modification, it is possible to use an articulation with two rings which are carried by the stub pieces, or arrangements in which washers are carried by lugs projecting from the cover plate and formed by pressing out and bending, as can be seen in FIGS. 4, 5 and 9, to be described later herein.

The diaphragm 25 bears on the base of the cover plate 26 in order to urge the pressure plate 22 towards the reaction plate 21. The friction clutch further includes a friction disc 23 connected to a central hub 24, which is mounted in rotation on the input shaft (not shown) of the gearbox by means of a splined coupling.

It will be recalled that the assembly of the components 26, 25, 24, 27 constitutes a unitary clutch mechanism, this being seamed by means of its dished cover plate on to the reaction plate 21, by virtue of the inserts 40, 41 in accordance with the invention.

The friction liners which are carried by the disc 23 at its outer periphery are normally gripped under the action of the diaphragm between the plates 21, 22, so that the clutch is normally engaged.

In order to declutch, the clutch being of the push to release type in this example, it is necessary to exert a thrust on the ends of the fingers of the diaphragm 25 by means of a clutch release bearing 28, thus disengaging the clutch.

To this end, the release bearing 28 is mounted for axial movement along a tube guide 30 which is fixed to the gearbox 31, and through which the input shaft of the latter extends.

The said release bearing 28 is controlled by a declutching fork 29 which causes it to be displaced axially to the left in FIG. 1, thus causing the diaphragm to be deflected in a tilting movement, several positions of which are shown in FIG. 1.

The first rotating mass 11 is arranged to be connected, through its inner periphery, in this example by means of screws 32, to a driving shaft which is here the crankshaft 34 of the internal combustion engine of the motor vehicle, while the second rotating mass 2 is coupled in rotation, through the clutch mechanism 22, 25, 26, 27 and the disc 23, to a driven shaft, which in this case is the input shaft of the gearbox of the vehicle.

The first mass 1 in the form of a plate consists essentially of a central portion 11, oriented transversely and being in the form of a plate or wheel disc, which is extended at its outer periphery by an integral, axially oriented, cylindrical skirt portion 12.

The said mass 1 carries at its outer periphery a starter crown 13 which is arranged to be driven by the pinion of a starter (not shown).

The inner portion of the mass 1 is provided with a plurality of holes, through which pass the screws 32 that fasten the mass 1 to the crankshaft 34.

It will be noted that the reaction plate 21 has corresponding holes which enable a tool to be passed through them for tightening the screws 32, and that the bearing 15 is of a reduced size, being located radially inwards of the said holes.

In this example, the insert 40, 41 is of metal plate and is press formed.

This insert has a transverse portion 41, which is embedded, and thus anchored firmly, in the transverse main portion of the reaction plate 21.

This portion 41 if formed with a plurality of holes 44 in order to improve the anchorage.

At its outer periphery, the said portion 41 is extended towards the base of the cover plate 26 by an axially oriented cylindrical portion 40, which may be divided into lugs and which constitutes the fastening zone in accordance with the invention. The portion 40 projects axially with respect to the friction surface of the reaction plate, and extends radially outwards beyond the outer periphery of the plate 21 (in the vicinity of the latter), and is therefore spaced away from the friction liners of the disc 23 and from the pressure plate 22 which they surround. The friction surface which is offered by the plate 21 to the friction liners of the disc 23 can thus extend as far as the outer edge of the plate 21. The cover plate 26 has at its outer periphery an axially oriented flange 35, which is of divided form in this embodiment in order to facilitate fitting.

The flange 35 is cylindrical, and is arranged to cooperate in sliding engagement with the inner periphery of the portion 40, which constitutes a centring element. The flange 35 is therefore in intimate contact with the portion 40.

The flange 35 is thus interposed between the portion 40 and the outer periphery of the pressure plate 22.

It is therefore possible to engage the cover plate 26, which in this example is of press formed sheet metal, within the portion 40 by a variable amount.

It is of course possible to reverse the structure, with the flange then surrounding the portion 40, cooperating with the outer periphery of the latter. In all cases, the portion 40 constitutes a guiding and centring element for the flange 35, and therefore for the cover plate 26.

In this way, the inclination and/or the load of the diaphragm 25 is able to be precisely controlled with respect to a datum, which is here the crankshaft 34 of the engine of the vehicle.

Once the diaphragm has attained the desired inclination or load, fastening of the cover plate is carried out, in this example on the free end of the fastening zone 40 of the insert, this fastening being obtained here by welding to give a band 43 of weld metal.

Once the flange 35 embraces the portion 40, the welding operation is carried out along the free edge of the flange.

In the present example, the resilient means of the resilient damping device comprise at least one resilient member 8, and are interposed generally radially between the plates 11 and 21.

In the present case, resilient members are mounted in at least one articulated cassette 10 (FIGS. 2 and 3), which comprises, firstly, a damper plate 3 formed with first housings 82 for mounting of the resilient members 8 therein, and secondly, two guide members 4, 5 disposed on either side of the said damper plate and having, in facing relationship with the first housing 82, second housings 81 for mounting the said resilient members 8, which consist in this example of two coil springs, and which may optionally be mounted in the housings 81, 82 in pairs, parallel to each other.

It is of course possible, in a modified version, to arrange a single spring in each cassette, and therefore to provide a single pair of housings 81 and a single housing 82.

The guide members 4, 5 are fixed to each other laterally. The damper plate 3 and the guide members 4, 5 are mounted in a head to toe configuration, with the said damper plate having, at one of its outer and inner peripheries, a first projecting element 72 for mounting a first articulating means 6 on a first one of the said masses 11, 12, while the guide members 4, 5 have, at their outer or inner periphery, a second projecting element 71, in facing relationship with each other, for mounting a second articulating means 7 on the other one of the said masses.

The said second projecting elements 71 and first projecting elements 72 are offset radially from each other, just like the articulating means 6, 7.

In this example, the first housings 82 and second housings 81 consist of radially oriented windows, with the second housings 81 being formed with lips.

In a modification, the first housing may consist of a radially oriented slot which is open radially on the opposite side from the first projecting element.

In a modification, the second housings 81 may consist of press-formed depressions.

In every case, however, the guide members 4, 5 have flanges 90, 91 at their outer periphery for fastening them together, in this example with the aid of rivets 92.

The said guide members 4, 5 are thus fixed laterally to each other by riveting.

In a modification, they may be fixed to each other, in their flanges, by welding or by clipping.

In this example, two springs 8 are mounted parallel to each other within the said cassette, and the damper plate 3 is articulated at its inner periphery on the plate 21, while the guide members 4, 5 are articulated at their outer periphery on the plate 11. Each of the members 4, 5 has, adjacent to the first projecting element 72, a notch 73 which is semicircular in this example, so that a pivot pin 6, to be described later herein, can extend through it, which enables the springs 8 to be increased in length.

The same is true for the damper plate 3, which has, adjacent to the projecting element 71, a notch 74 which is semicircular in this example, so that a pivot pin 7, to be described later herein, can extend through it.

Accordingly, the springs 8 are of maximised length.

More precisely, the damper plate 3 is articulated on the plate 21 (at the inner periphery of the latter) by means of a pivot pin 6 having a shouldered head which is fixed, in this example by force fitting, on the plate 21, and which is surrounded by a needle bearing, which is interposed between the said pivot pin and a bush which is fixed on the damper plate 3.

In a modification, a plain bearing may be used.

The said bush extends axially between the plates 11 and 21, being secured to the damper plate 3 by welding in the present case.

The members 4, 5 are articulated at their outer periphery on the plate 11 by means of a pivot pin 7, which is force fitted into the plate 11 and into a member 60, at the outer periphery of the plate 21.

The pivot pin 7 is surrounded by a needle bearing interposed between the said pivot pin and a sleeve which is fixed, in this example by welding, to the guide members 3, 4 [sic].

The sleeve and the needle bearing are interposed axially between the plate 11 and the member 60, which is formed with a chimney portion for receiving the pivot pin 7.

In a modification, the sleeve may be carried on the members 4, 5 by being seamed on to them. To this end, the sleeve has a central portion of enlarged diameter, extending between the two members 4, 5 and offering a shoulder to these latter. The ends of the sleeve are upset so as to fasten it, by seaming, to the members 4, 5.

The plate 11 is formed with an aperture 16 opposite to a cassette 10.

In this example, four articulated cassettes 10 and four pivot pins 6, 7, spaced apart at regular intervals, are provided as shown in FIG. 2. This number does of course depend on the application.

The member 60 is fastened by riveting to the outer periphery of the plate 11, and more precisely on the portion 12 of the latter.

The said member 60, which is of metal plate in this example, then serves to stiffen the plate 11 which is perforated by the through apertures 16, the inner edges of which are in the form of an arc of a circle.

It also, with the plate 11, defines a support in which the pivot pins 7 are mounted.

The member 60 has at its outer periphery an axially oriented flange formed with slots 61 which constitute mortices, and with lugs 62 at its free end. The lugs 62 are bent back radially towards the axis of the assembly.

The member 60 is accordingly shaped in the form of a comb before the lugs 62 are bent back.

Situated between the outer periphery of the transverse portion of the member 60 and the lugs 62, there are, in axial succession, a friction ring 51, an application ring 52, an axially acting resilient ring 53 which is a Belleville ring in this example, but which may in a modified version be a corrugated ring, and finally an abutment member 54 in contact with the lugs 62.

The application ring 52 has at its outer periphery lugs which constitute tenons, and which are engaged in the slots 61 of the member 60. The ring 52 is thus coupled in rotation, optionally with a clearance, with the member 60 through a coupling of the tenon and mortice type.

The member 51 is made of a friction material, which in this example is a plastics material, and has a cross section which is generally in the form of an inverted L.

The member 51 has, at its inner periphery, local bosses 63 which are engaged, with or without a circumferential clearance, in local recesses 45 press formed in the junction zone where the fastening zone 40 joins the anchor zone 41 of the fastening insert 40, 41.

The recesses 45 are directed towards the axis of the assembly, being in contact with the outer periphery of the reaction plate 2. For this reason the bosses 63 are chamfered.

Thus, by virtue of the fastening insert 40, 41, a hysteresis device 50 is provided which works between the member 40, 41 and the member 60, the said device comprising, firstly, the rings 52, 53, 54 which are mounted in rotation on the member 60 through the member 52, and secondly, the friction member 51 which is mounted in rotation, optionally with a clearance, on the member 40 and therefore on the plate 21. The device 50 thus constitutes a friction device acting between the two masses 1, 2, while making the best use of the available space without interfering with the clutch casing.

Thus, during the relative movement between the two masses 1, 2, the springs 8, and therefore the cassettes 10, become inclined as is shown in the upper part of FIG. 2, with relative movement between the members 51 and 60. The springs 8 are compressed during this relative movement.

The two concentric masses 1, 2 are, in this way, mounted for movement of one with respect to the other against the action of radially acting resilient means 8 and of axially acting friction means 50.

It will also be noted that two friction pads 9 are interposed operatively between the lateral edges of the damper plate 3 and the lateral edges of the guide members 4, 5.

These pads 9 include bosses which are engaged in slots formed in the lateral edges of the damper plate 3. The pads 9 overlie the edge of the damper plate 3.

Thus, there is an additional friction effect during the relative movement between the two masses 1, 2, with the pads guiding the damper plate 3 during its relative movement with respect to the members 4, 5. In this way any risk of jamming is avoided.

It will be noted that the insert 40, 41 thus has a transversely oriented anchor zone 41 which is buried in the plate 21, together with an axially oriented fastening zone 40, so providing a device both for friction and for fastening the cover plate 26, in this example in a controllable manner.

The engine flywheel may of course be all in one piece. Thus, in FIG. 4 the reaction plate 21 is arranged to be secured directly on to the crankshaft of the engine.

This plate 21 then carries the starter crown 13.

In FIG. 4, the disc 23 is of the elastic type, and carries, in a way known per se, and as can be seen in FIG. 1 of the document FR-A-2 463 874, two guide rings which are disposed on either side of a damper plate fixed to the hub 24.

Circumferentially acting resilient means (not shown) are interposed operatively between the damper plate and the two guide rings, so as to couple them together resiliently.

The guide rings are coupled together by the spacer bars which extend through apertures formed for this purpose in the damper plate.

The resilient means, which consist in practice of coil springs, are mounted in windows formed in facing relationship with each other in the damper plate and in the guide rings.

The spacer bars enable the disc that carries the friction liners to be assembled with the guide rings.

These friction liners are arranged to be gripped between the pressure plate 22 and the reaction plate 21.

As in FIG. 1, the diaphragm 25 bears at the outer periphery of its Belleville ring on a boss which projects axially from the pressure plate 22, while at the inner periphery of its Belleville ring it is mounted between a primary abutment and a secondary abutment.

These abutments are part of the means 133 which apply the diaphragm pivotally to the cover plate 126.

The said means 133 comprise lugs which, in this example, project integrally from the cover plate 126, being formed by bending and press forming. These lugs extend through openings which are formed in the diaphragm at the root of its fingers, and their ends are bent radially away from the axis of the assembly.

A frusto-conical ring and an application ring are interposed between the bent back ends of the said lugs and the said diaphragm.

The frusto-conical ring affords a secondary abutment for the diaphragm 25, facing a primary abutment which is press formed in the cover plate 126.

Because of the insert in accordance with the invention, the cover plate 126 can be made in a simple form, being reduced to an annular plate which has the assembly means 133 at its inner periphery.

This plate 126, which is of metal in this example, is fixed, in the present case by means of a band of weld metal 143, to the fastening zone 140 of the metallic insert.

The cover plate is fixed to the free end of the fastening zone 140.

As before, it is possible to obtain precise regulation of the inclination and/or the load of the diaphragm 25, by causing the cover plate 126 to penetrate to a greater or lesser extent into the zone 140, which is in the form of a crown.

In this example, the insert is oriented axially and is in the form of a tube. It is anchored in the annular skirt which is carried by the reaction plate 21 at its outer periphery.

The insert 140 has holes 144 whereby it is anchored firmly in the plate 21.

These holes are filled with the material of the plate 21, and in this example they are oblong, though in a modification they may be circular.

The insert thus has an anchor zone embedded within the mass of the plate 21, radially outwards of the friction surface offered by the pressure plate 1 to the friction disc 23, together with an axially projecting zone 141 at the outer periphery of the plate 21. This zone extends towards the cover plate.

The zone 141 may optionally be divided into fingers.

It will be noted that overall size is reduced in this region. In this connection, part of the casing 147 of the clutch can be seen in the lower part of FIG. 4. This casing is very close to the free end of the skirt of the plate 21, so that it is difficult to fasten the cover plate to the skirt at this location by screw fastening, as the screws would run the risk of interfering with the said casing.

The use of welding in accordance with the invention not only enables the cover plate to be fastened, but also enables the overall size to be reduced.

The cover plate can of course be provided with a radial fastening flange at its outer periphery.

Figure 6:
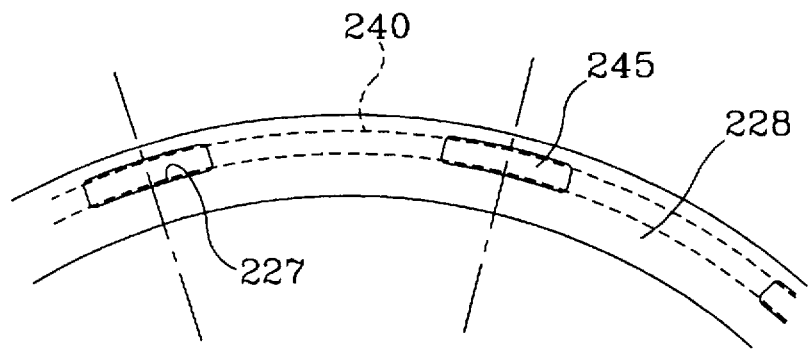
FIG. 6 is a partial sectional view view as seen in the direction of the arrow 6 in FIG. 5.

Thus in FIGS. 5 and 6, the cover plate 226 has holes 227 at its outer periphery.

These holes are so arranged that shouldered lugs 245, which are part of the free end of the fastening zone of the metallic insert 240 buried within the mass of the skirt of the plate 21, extend through them as in FIG. 4.

The radial fastening flange of the cover plate thus makes abutting engagement against the shoulder of the lugs 245.

In this example, the shoulder is defined by the free end of the insert 240, with the lugs 245 projecting axially with respect to the said free end. The lugs 245 may of course be narrower at their free end than in their anchor zone by which they are anchored to the insert, thereby defining shoulders.

The free ends of the lugs 245 are adapted so that, after having passed through the holes 227, they are upset so as to secure the cover plate and the zone 240 together.

The cover plate 226 is thus secured to the fastening insert 240 by seaming.

The structures can of course be reversed.

Figure 7:
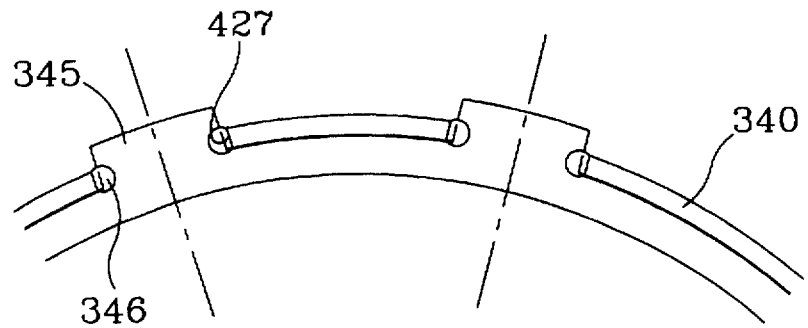
FIG. 7 is a view similar to FIG. 6, but shows a fourth embodiment by way of example.

Thus, in FIG. 7, the cover plate has at its outer periphery transversely oriented lugs 345, which are engaged in through openings 427 formed in the fastening zone 340 of the metallic insert at its free end.

After the lugs 345 have been inserted into the openings 427, the material of the lateral edges of the opening 427 are upset, leading to the cover plate being secured to the insert 340 by seaming, with the said edges undergoing plastic flow at 346.

The insert 440 may of course have a free end which is offset radially outwards with respect to the main portion of its fastening zone. This offset is defined in a rounded junction zone.

Figure 8:
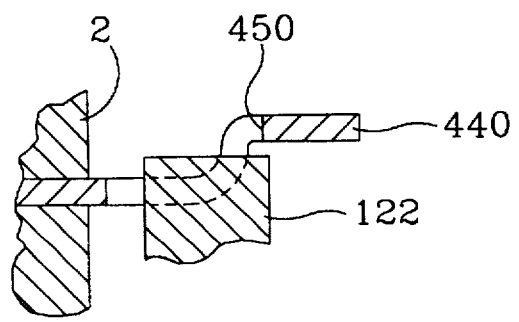
FIG. 8 is a partial sectional view view in axial cross section, showing a fifth embodiment by way of example.

Having regard to this offset, it is possible (FIG. 8) to form, through both the free end of the fastening zone 440 and the main portion of the zone 440, apertures 450.

Thus, the pressure plate 22 may have at its outer periphery axially oriented lugs 122 which are engaged, in the manner of tenons, in the apertures 450 which constitute mortices. These lugs 121 pass below the free end of the portion 440.

The cover plate is of course then fixed to the free end of the zone 440, either as in FIG. 7, or, in a modification, by welding.

Thus, thanks to the invention, the pressure plate 22 can be coupled in rotation to the reaction plate 21, while being mounted for axial movement with respect to the latter.

It is therefore possible, thanks to the invention, to omit the tongues 27 of FIG. 1.

It is of course possible to retain the lugs 27 of FIG. 1 and to make use of them for the assembly of a twin-disc clutch using the insert 440.

This clutch comprises two friction discs and two pressure plates, one of which is coupled in rotation, with axial mobility, by the tenons 122, while the other plate is coupled in rotation to the cover plate by the tangential tongues.

It can be seen, by reference to the document FR-A-2 628 492 (U.S. Pat. No. 4,892,177), that the arrangement in accordance with the invention enables a twin-disc clutch to be easily made with the aid of the inserts according to the invention.

The axially oriented fastening zone of the metallic insert can of course be formed with holes for ventilating the clutch.

The cover plate can of course be fastened by being clipped to the inserts 540 (FIG. 9). In this case the metallic inserts 540 have at their free ends shouldered lugs 541 which extend through a complementary associated aperture formed in the flange of the cover plate. After having passed through the apertures, the lugs are bent back towards the axis of the assembly, or, in a modification, away from the axis of the assembly.

In FIG. 1, the two masses may of course be mounted for movement of one with respect to the other, against the action of circumferentially acting resilient means.

Figure 11:
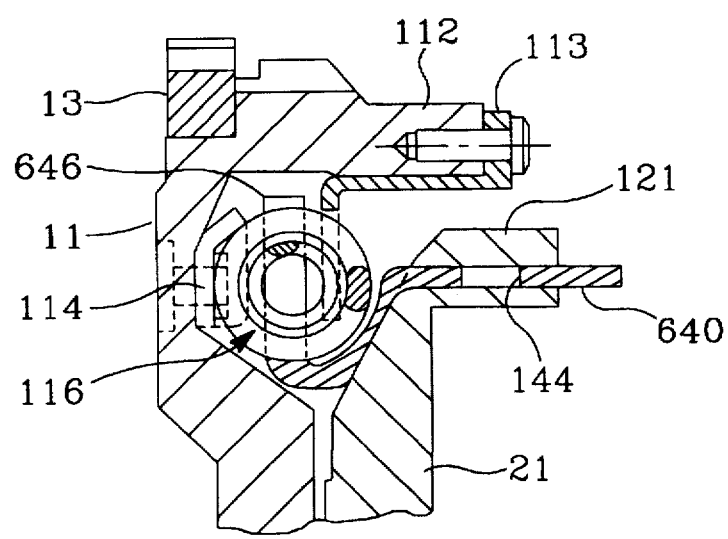
FIG. 11 is a view similar to FIG. 4, but shows a seventh embodiment by way of example.

Thus in FIG. 11, the insert 640, anchored in the peripheral skirt 121 of the reaction plate 21 with the aid of holes 144 as in FIGS. 4 and 5, is extended on the face opposed to the reaction plate, that is to say towards the plate 11.

The metallic insert hugs the profile of the reaction plate 21, which is reduced in thickness and inclined at this location. It stiffens the plate 22.

The free end of the said insert is bent radially outwards so as to form radial lugs 646, which afford an abutment for the circumferential ends of the circumferentially acting resilient members 116, which are mounted in pairs.

These springs 116, which in this example are in the form of pre-curved coil springs mounted in pairs, also bear on members 114 which are fixed to the plate 11. More precisely, this plate 11 has, from place to place, abutment members 114 which are secured by riveting to the plate 11, together with abutment members 113 which are fixed, in this example by screw fastening, to the free end of the skirt 112 formed on the plate at its outer periphery.

In this example, the plate 11 generally surrounds the reaction plate 21. This plate 11 is relieved for mounting the springs 116 and members 114, 113, together with the insert 140. The double flywheel therefore has a reduced axial size.

It is possible to provide a sealed chamber, filled for example with grease and containing the circumferentially acting springs 116. It is merely necessary to provide a sealing ring between the skirt 121 and the member 113, and between the plates 11, 21 radially inwards of the springs, which are thereby lubricated so as to reduce wear.

All combinations are of course possible. Thus, the insert of FIG. 4 may be extended by a transverse portion extending into the transverse portion of the reaction plate 21.

The cover plate 126 may be fitted by clipping or seaming on the inserts 240, 540 respectively.

As will be understood, and as will appear from the description, it is possible to extend the fastening zone of the insert radially inwardly or outwardly, so as to form a transverse portion whereby the cover plate can be secured by screw fastening, riveting, welding, or otherwise.

With an insert having a transverse flange, it is thus possible to fit cover plates and pressure plates of different sizes on a given reaction plate.

The clutch may of course be of the pull to release type, as described in the document FR-A-2 463 874 (U.S. Pat. No. 4,362,230).

The cover plate may be made of plastics material reinforced with fibres, for example glass fibres.

In a modified version of FIG. 1, the portion 40 may lie in contact with the outer periphery of the plate 21, with the flange 35 then surrounding the portion 40 in the way described earlier herein. It then becomes possible to fix the starter crown 13 on the portion 40, especially when the reaction plate is fixed directly on the crankshaft 34. In each case (FIG. 1 and the modified version), the friction surface of the reaction plate is able to extend as far as the outer edge of the reaction plate. The same is true for the friction liners of the friction disc.

In a modified version, the stub pieces 33 and the diaphragm 25 can be mounted outside the cover plate, as in FIG. 4 of the document FR-A-1 524 350.

In that case, the bosses provided on the pressure plate 22 for engagement by the diaphragm 25 extend through the cover plate, which is fixed on the insert, for example as in FIG. 7, by welding.

It will be appreciated that the rolling bearing 15 is of reduced size, and that it lies radially inwards of the screws 32, which enables the springs 8, and therefore the cassettes 10, to be increased in length.

In the drawings, in the rest position of the damped flywheel, the cassettes 10 extend radially, so that the articulating means 6, 7 are aligned on a common axis.

In a modified version, in the said rest position the cassettes 10 may be slightly inclined, with the articulating means 6, 7 then being offset circumferentially.

It is of course possible to reverse the structures, with the members 4, 5 being articulated at their inner periphery on the reaction plate 21, while the damper plate 3 is then articulated at its outer periphery on the plate 11, with the member 60 being interposed.

The closed holes 44 may be replaced with press formed portions, or with slits, or with lugs, preferably alternated with each other.

For example, in FIG. 1 the anchor portion 41 would then preferably have a first set of press formed portions directed towards the plate 11, and a second set of press formed portions directed axially towards the plate 22. It is of course equally possible to provide holes.

In FIG. 4, the press formed portions would be directed radially towards the axis and radially away from the axis.

The holes may be replaced by open cut-outs formed in the edges of the insert.

In all cases, the insert is provided with deformations, which are either open (in the sense that the holes, the cut-outs, the slits and the lugs are open), or not open (i.e. the press formed portions), or both at once, for enlarging its anchorage in the mass of the reaction plate.

It will be noted that in FIGS. 4, 5, 9, the holes are formed in a press formed zone. The insert may of course carry pivot pins or the like, attached on the latter, for example by seaming. An improved anchorage is thus obtained. The insert accordingly has the benefit of hooking means in the form of deformations, pins etc.

As will be understood from the foregoing, the apertures 16 enable any interference between the cassettes 10 and the plate 11 to be avoided.

The said apertures 16 are accordingly disengagement apertures, which enable the axial size of the damped flywheel to be reduced, and which assist ventilation.

Finally, the insert may optionally be of a divided form. However, it does preferably include a continuous annular portion.

It is of course possible, for example in FIG. 1, to divide the inner periphery of the transverse portion into lugs.

Similarly, in FIGS. 4, 5, 9 the ends of the inserts may be divided into lugs.

In the drawings, the cover plate is press formed from metal plate. In a modified version, the cover plate can of course be made of a mouldable material, for example as a casting or of an aluminium based material or fibre reinforced plastics material. The fastening zone of the insert may be long in the axial direction, with its length being determined according to the application.

We claim:

1. A reaction plate having a mass of moldable material for a friction clutch having a cover plate (26, 126, 226), in which said reaction plate has a transverse main portion, including a fastening insert (40, 41 - 140 - 240 - 340 - 440 - 540 - 640) having a transverse oriented anchor zone anchored in the mass of the reaction plate (21) and being embedded therein thereby preventing all relative movement between said fastening insert and said reaction plate, said insert has, projecting in the vicinity of the outer periphery of the reaction plate 21, a fastening zone (40, 140, 240, 340, 440, 540, 640) extending axially away from the reaction plate (21) for the fastening of the cover plate (26) of the friction clutch, wherein the fastening insert (40, 41 - 140 - 240 - 340 - 440 - 540 - 640) has deformations (44, 144) for enhancing its anchorage in the reaction plate.

2. A plate according to claim 1, wherein the insert (40, 41 - 140 - 240 - 340 - 440 - 540 - 640) has holes (144) for anchoring it in the reaction plate (21).

3. A plate according to claim 1, wherein the insert (40, 41 - 140 - 240 - 340 - 440 - 540 - 640) includes an anchor zone extending transversely in a transverse main portion of the reaction plate (21).

4. A plate according to claim 1, in which said reaction plate has a skirt at its outer periphery, wherein said insert is embedded into said skirt.

5. A plate according to claim 1, wherein the fastening zone has a transversely oriented flange at its free end.

6. A plate according to claim 1, wherein a cover plate is secured by welding on the fastening zone of the inserts (40, 41 - 140 - 240 - 340 - 440 - 540 - 640).

7. A plate according to claim 1, wherein the fastening zone (240) has shouldered lugs (245) for securing the cover plate (226) by seaming on the fastening zone (240).

8. A plate according to claim 1, wherein, the fastening zone (540) has shouldered lugs for securing the cover plate by clipping on to the fastening zone.

9. A plate according to claim 1, being part of an engine flywheel comprising two masses (1, 2) which are mounted for movement of one with respect to the other against the action of circumferentially acting resilient members, wherein the said insert (640) is extended in length so as to project on another surface of the reaction plate (21) and to offer lugs (646) for engagement with the resilient members (116).

10. The plate according to claim 1, wherein said deformations are defined by holes extending through said transverse oriented anchor zone, said reaction plate being molded about said transverse oriented anchor zone and through said holes.

11. The plate according to claim 1, wherein said reaction plate comprises a central axis and said transverse oriented anchor zone extends within said reaction plate perpendicular to said central axis.

12. A reaction plate having a mass of moldable material for a friction clutch having a cover plate (26, 126, 226), in which said reaction plate has a transverse main portion, including a fastening insert (40, 41 - 140 - 240 - 340 - 440 - 540 - 640) having an anchor zone anchored in the mass of the reaction plate (21), being embedded within the latter, and in that said insert has, projecting in the vicinity of the outer periphery of the reaction plate 21, a fastening zone (40, 140, 240, 340, 440, 540, 640) extending axially away from the reaction plate (21) for the fastening of the cover plate (26) of the friction clutch, wherein, a cover plate is secured by welding on the fastening zone of the inserts (40, 41 - 140 - 240 - 340 -440 - 540 - 640) and the cover plate has at its outer periphery an axially oriented flange (35) which is engaged in an internal bore of an annular fastening zone (40) of the insert (40, 41).

13. A plate according to claim 12, wherein the cover plate is secured, by welding through its flange (35), on a free end of the fastening zone (40).

14. A reaction plate having a mass of moldable material for a friction clutch having a cover plate (26, 126, 226), in which said reaction plate has a transverse main portion, including a fastening insert (40, 41 - 140 - 240 - 340 - 440 - 540 - 640) having an anchor zone anchored in the mass of the reaction plate (21), being embedded within the latter, and in that said insert has, projecting in the vicinity of the outer periphery of the reaction plate 21, a fastening zone (40, 140, 240, 340, 440, 540, 640) extending axially away from the reaction plate (21) for the fastening of the cover plate (26) of the friction clutch, wherein, said plate is part of an engine flywheel comprising two masses (1,2) which are mounted for movement of one with respect to the other against the action of resilient members (8), wherein, the fastening zone (40) of the insert has local press formed portions (45) for mounting a friction ring (51) which is part of a hysteresis device (50) interposed operatively between the two masses (1,2) of the engine flywheel.

15. A reaction plate having a central axis formed of a mass of moldable material for a friction clutch having a cover plate, said reaction plate comprising:

a transverse main portion extending substantially perpendicular to said central axis;

a fastening insert having a transverse oriented anchor zone, said anchor zone extending substantially perpendicular to said central axis and embedded within said transverse main portion of said reaction plate, and a fastening zone extending axially away from said reaction plate for fastening to said cover plate of said friction clutch, wherein said reaction plate is molded about said transverse oriented anchor zone and thereby disposed directly adjacent to and circumscribing an outer peripheral surface of said transverse oriented anchor zone to prevent relative movement between said fastening insert and said reaction plate.

* * * * *